United States Patent [19]

Isozumi et al.

[11] Patent Number: 4,900,945
[45] Date of Patent: Feb. 13, 1990

[54] ENGINE STARTER

[75] Inventors: Shuzoo Isozumi; Toshinori Tanaka; Kazuhiro Odawara, all of Himeji, Japan

[73] Assignee: Mitsubishi Denki Kabushiki Kaisha, Japan

[21] Appl. No.: 254,937

[22] PCT Filed: Feb. 3, 1988

[86] PCT No.: PCT/JP88/00097
§ 371 Date: Sep. 1, 1988
§ 102(e) Date: Sep. 1, 1988

[87] PCT Pub. No.: WO88/05864
PCT Pub. Date: Aug. 11, 1988

[30] Foreign Application Priority Data

Feb. 5, 1987 [JP] Japan .................. 62-265580
Feb. 10, 1987 [JP] Japan .................. 62-28625

[51] Int. Cl.$^4$ ............... F02N 11/00; F02N 15/06
[52] U.S. Cl. ..................... 290/48; 74/7 C; 310/42
[58] Field of Search ............... 290/48, 38 R; 123/179 R; 74/6, 7 R, 7 C; 310/42

[56] References Cited

U.S. PATENT DOCUMENTS

| 3,791,684 | 2/1974 | Hamman | 290/38 R |
|---|---|---|---|
| 4,295,069 | 10/1981 | Givan et al. | 310/67 R |
| 4,366,385 | 12/1982 | Williams | 290/48 X |
| 4,760,274 | 7/1988 | Isozumi | 290/48 |
| 4,776,082 | 10/1988 | Janzer | 310/42 X |
| 4,791,328 | 12/1988 | Lakin | 310/42 |
| 4,818,889 | 4/1989 | Kinoshita | 290/48 |
| 4,838,100 | 6/1989 | Tanaka | 74/7 R X |

FOREIGN PATENT DOCUMENTS 480006 7/1929 Fed. Rep. of Germany .
1476452 12/1970 Fed. Rep. of Germany .

Primary Examiner—A. D. Pellinen
Assistant Examiner—W. E. Duncanson, Jr.
Attorney, Agent, or Firm—Leydig, Voit & Mayer

[57] ABSTRACT

An engine starter comprises a hollow armature rotary shaft having a plurality of cam surfaces of an over-running clutch mechanism and having at one end a reduced-diameter portion on which a sleeve member is press fit and at the other end a stopper. The sleeve member has a rolled portion on its outer circumference on which an armature core is secured by press fit so that the armature core is firmly held by the sleeve member and the stopper on the armature rotary shaft. The armature rotary shaft may have a polygonal cross-sectional outer configuration so that the armature core can be firmly press-fit onto polygonal armature rotary shaft. A method for concurrently brazing and magnetically annealing the armature core comprises heating the armature assembly between 780° C. and 850° C.

8 Claims, 5 Drawing Sheets

ENGINE STARTER

TECHNICAL FIELD

This invention relates to an engine starter and, more particularly, to a coaxial-type engine starter for use in starting up a vehicular engine.

BACKGROUND ART

A conventional engine starter for use in staring up a vehicular engine has been constructed as shown in FIG. 1.

The conventional engine starter 1 shown in FIG. 1 comprises a d.c. motor 2, an over-running clutch mechanism 4 slidably mounted over an extended shaft portion of an armature rotary shaft 3, a solenoid switch assembly 5 disposed on one side of the d.c. motor 2 for slidably moving the over-running clutch mechanism 4 along the extended shaft portion, and a shift lever 7 engaged at its one end with a plunger rod 8 of the solenoid switch assembly 5 and at its the other end with an annular member 6 mounted to the over-running clutch mechanism 4.

Thus, the conventional engine starter 1 needs the shift lever 7 for sliding the over-running clutch mechanism 4 on the extended shaft portion of the armature rotary shaft 3, and since the bi-axial arrangement, in which the solenoid switch assembly 5 for actuating the shift lever 7 and supplying electric power to the d.c. motor 2 is disposed on the side of the d.c. motor 2, is employed, the engine layout during the design of the vehicle is severely limited.

In order to eliminate the above problem, it has been proposed to position the solenoid switch on one of the axial end portions of the d.c. motor to form the starter into a simpler configuration such as an elongated cylinder. According to this proposition, the basic construction is such that the armature rotary shaft is made hollow and that the plunger rod of the solenoid switch assembly which has been used to operate the shift lever in the conventional design is elongated to extend through the inner passage or a central bore of the armature Electromagnetic core to reach to the output rotary shaft, and the thus-constructed starter is referred to as a coaxial starter since the armature rotary shaft of the d.c. motor and the rod of the solenoid switch are axially aligned. In order to further reduce the axial length of the coaxial starter having the above basic structure, a starter has also been proposed in which an over-running clutch mechanism is provided within the interior of the armature rotary shaft constituting the armature of the d.c. motor.

The engine starter containing the over-running clutch mechanism has formed in the inner surface of the armature rotary shaft recessed portions in which a plurality of cam surfaces are formed to define wedge-shaped spaces between the cam surfaces and the outer surface of a clutch inner member inserted within the armature rotary shaft. Each of the wedge-shaped spaces is provided with a roller and a biasing spring. In other words, the starter of this kind is constructed such that the armature rotary shaft is also used as a clutch outer member of the over-running clutch.

However, in the engine starter constructed as described above, the armature rotary shaft has formed on its outer circumferential surface a plurality of axially extending grooves and ridges such as serrations, which are formed generally by rolling. During the rolling, the armature rotary shaft must be pressed hard against a rolling tool, so that the clutch cam surfaces formed in the inner circumferential surface of the hollow armature rotary shaft are disadvantageously deformed.

DISCLOSURE OF THE INVENTION

The present invention has been made to solve the above problem of the conventional design and has as its object the provision of an engine starter in which an armature core can be secured to the outer surface of the armature rotary shaft without distorting the inner circumferential surface of the central bore of the armature rotary shaft of the d.c. motor which defines cam surfaces of an over-running clutch mechanism of the engine starter.

The engine starter of the present invention is characterized in that the armature of the d.c. motor comprises a hollow armature rotary shaft having formed on an inner peripheral surface a plurality of cam surfaces composing an over-running clutch mechanism and having at one end a reduced-diameter stepped portion formed on an outer circumference thereof within an axial length range in which no cam surfaces are provided and having at the other end a radially outwardly projecting flange-shaped stopper, in that a sleeve member having a rolled portion on the outer circumference, thereof and is press fit into the reduced-diameter stepped portion of the armature rotary shaft and in that an armature core placed over the outer circumference of the armature rotary shaft is secured by means of a rolled engaging portion formed on the outer circumferential surface of the sleeve member.

The engine starter of the present invention is also characterized in that the armature of the d.c. motor comprises a hollow armature rotary shaft having on the inner circumferential surface a plurality of cam surfaces for an over-running clutch mechanism and a polygonal cross-sectional configuration at the outer circumferential portion, and an armature core press-fit onto the outer circumference of the armature rotary shaft.

The method for manufacturing an engine starter of the present invention is for manufacturing an engine starter in which a d.c. motor having an armature comprising a hollow armature rotary shaft having on the inner circumferential surface a plurality of cam surfaces for an overrunning clutch mechanism and a polygonal cross-sectional configuration at the outer circumferential portion, and an armature core press-fit onto the outer circumference of the armature rotary shaft, and the method is characterized by the steps of inserting a brazing material between the armature core and the armature rotary shaft, and heating and annealing so that the step of brazing and the step of magnetic annealing for eliminating magnetorestriction of the armature core are achieved concurrently.

According to the engine starter of the present invention, the armature rotary shaft of the armature of the d.c. motor can be formed by forging, etc. concurrently with the forming of the cam surfaces in the inner circumference, and a sleeve member for securing the armature core is press fit into the small-diameter stepped portion of the armature rotary shaft. Therefore, the armature rotary shaft can be manufactured without deforming the cam surfaces formed in the inner circumferential surface and the armature core can be firmly secured to the armature rotary shaft.

Also, according to the engine starter of the present invention, the armature rotary shaft of the armature of the d.c. motor has a polygonal outer configuration, so that it can be formed by cold forging at the same time the inner cam surfaces are being formed, and the armature core is press-fit onto the outer circumference of the armature rotary shaft. Since each corner of the outer circumference of the armature rotary shaft bites the inner circumferential surface of the armature core when the two members are engaged, the armature core is rigidly secured in the circumferential direction relative to the armature rotary shaft.

According to the method for manufacturing an engine starter of the present invention, during the mounting of the armature core onto the armature rotary shaft, the heating and annealing treatment is carried out after brazing material has been inserted between the armature rotary shaft and the armature core, thereby to concurrently achieve the steps of brazing and removing magnetoristrction of the armature core.

BEST MODE FOR CARRYING OUT THE INVENTION

The engine starter of the present invention will now be described in conjunction with preferred embodiments of the present invention shown in the accompanying drawings.

Figure 1:
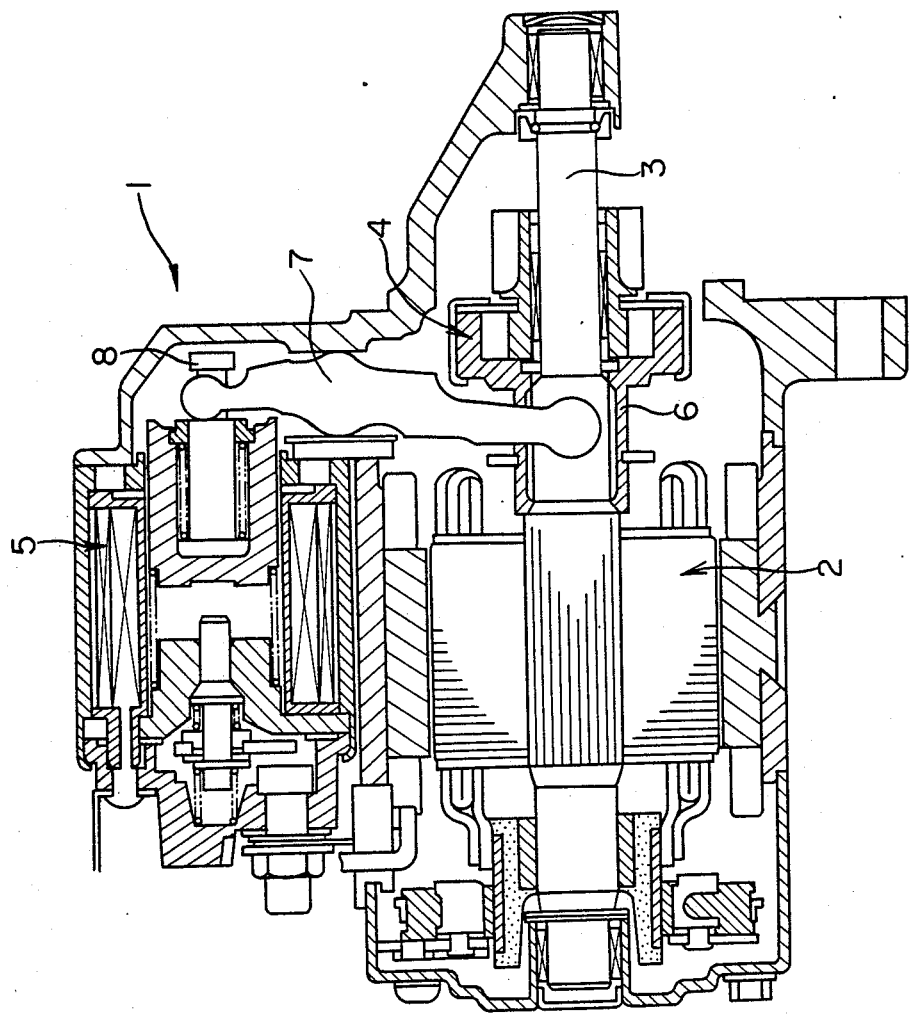
FIG. 1 is a cross-sectional view of the conventional engine starter.
Figure 2:
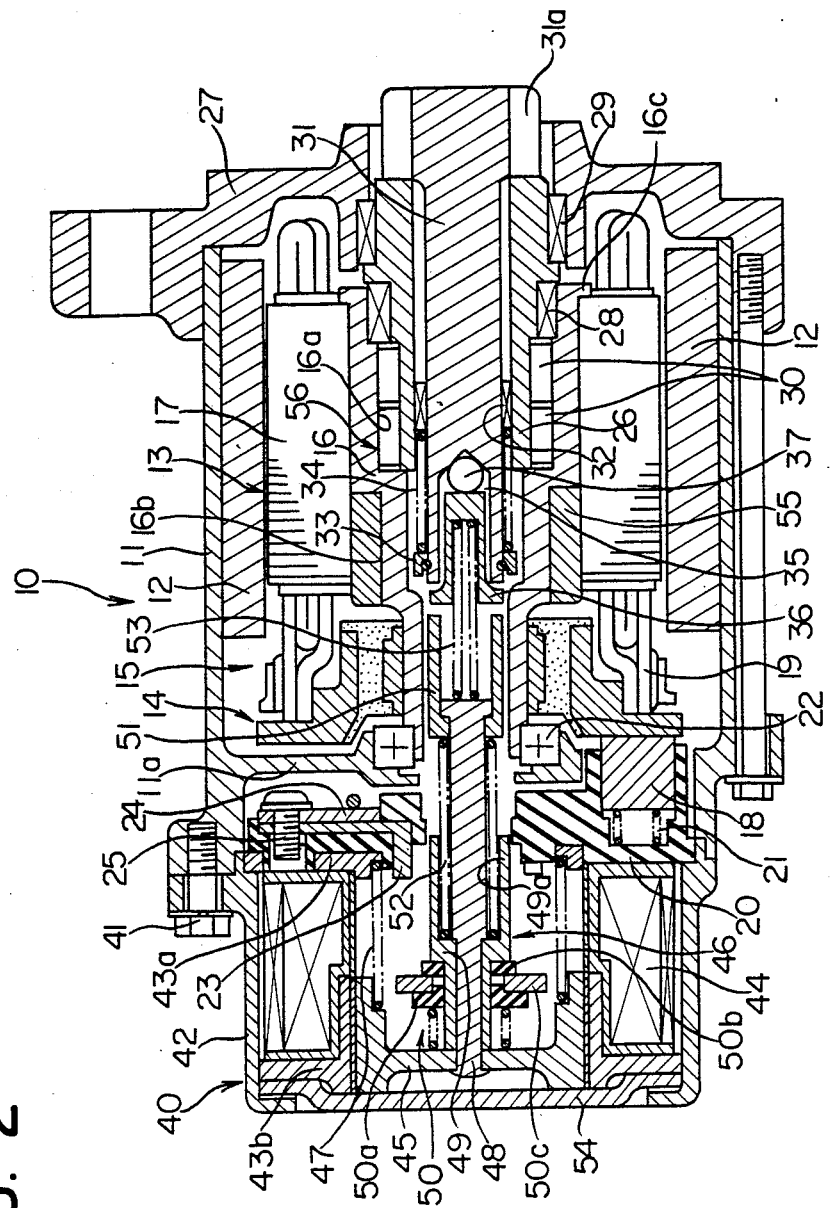
FIG. 2 is a cross-sectional view of one embodiment of the starter of the present invention.

FIG. 2 illustrates an engine starter 10 of one embodiment of the present invention. The engine starter 10 of this embodiment comprises a d.c. motor 15 composed of permanent magnets 12 mounted with circumferential intervals therebetween to the inner circumferential surface of a tubular yoke 11 which constitutes a magnetic circuit and defines an outer wall of the engine starter 10, an armature 13 rotatably disposed at the center of the yoke 11, and a face-type commutator 14 mounted on one end portion of the armature 13.

The armature 13 of the d.c. motor 15 comprises a hollow armature rotary shaft 16 and an armature core 17 mounted on the outer circumference of the rotary shaft. The inner surface of the hollow armature rotary shaft 16 has formed therein a large-diameter recessed portion which has formed in the inner surface thereof a plurality of ca surfaces 16a arranged in a circumferential direction. The face-type commutator 14 mounted over the outer circumference on one end or on the lefthand end in FIG. 2 of the armature rotary shaft 16 is provided with a plurality of segments disposed in a plane perpendicular to the armature rotary shaft 16 for sliding contact with a plurality of brushes 18 for commutation, each of the segments being connected to one end of the armature coil 19 wound on the armature core 17.

The brushes 18 are supported by electrically insulating brush holders 20 made of plastic disposed outside of the rear bracket portion 11a integrally formed with the yoke 11 and forming a part of an earth circuit. The brushes 18 extend from the resepective openings formed in the rear bracket portion 11a and are brought into a pressure-contact relationship against the sliding surfaces of the commutator 14. A bearing 22 is fitted on the inner circumferential surface of the central opening of the rear bracket portion 11a, and the bearing 22 supports the rear end or the commutator side end of the armature rotary shaft 16. The brush holder 20 is constructed by insert-molding stationary contacts 23 which are connected to an unillustrated terminal on the rear portion, and by securing by a screw 25 a terminal 24 to which a plus side lead wire (not shown) of the brush 18 is welded.

The cam surfaces 16a formed in the circumferential surface of the large diameter recessed portion of the armature rotary shaft 16 constitute an over-running clutch mechanism 56. That is, within the hollow portion or the central bore of the armature rotary shaft 16, a tubular inner member 26 is inserted to extend over the axial length of the cam surfaces 16a and rotatably supported by bearings 28 and 29 from the armature rotary shaft 16 and from the front bracket 27, respectively. The front brakcet 27 is mounted at the front end (the righthand end in FIG. 2) of the yoke 11 and secured thereto by bolts connected to the rear bracket portion 11a. The outer circumferential surface of the inner member 26 and the cam surfaces 16a formed in the inner surface of the large-diameter recessed portion together define a plurality of wedge-shaped spaces, and each of the wedge-shaped spaces is provided with a roller 30 for engaging and coupling the cam surfaces 16a and the outer circumferential surface of the inner member 26 and a spring (not shown) for biasing the roller 30 in the direction of engagement. Thus, the over-running clutch mechanism 56 is composed of the cam surfaces 16a, the inner member 26, the roller 30, the biasing spring, etc., and the armature rotary shaft 16 itself is used also as the clutch outer member to function as one part of the mechanism 56. One example of the over-running clutch mechanism 56 can be seen from FIG. 6 which will be described in more detail later on.

Within the inner passage of a central bore of the tubular inner member 26, a pinion shaft 31 which is an output rotary shaft is coaxially disposed, and the inner member 26 and the pinion shaft 31 are engaged with each other in a rotation transmitting manner and an axially movable manner by means of helical splines formed on the outer and the inner circumferences of the inner member 26 and the pinion shaft 31. At the front (right as seen in FIG. 2) end of the pinion shaft 31, a pinion 31a for meshing with a ring gear (not shown) of the engine is integrally formed. The pinion shaft 31 is rotatably supported against the inner member 26 by a bearing 32 which is press fit on the inner surface of the rear portion of the inner member 26. A spring 34 for biasing the pinion shaft 31 toward its return position is disposed between the bearing 32 and a stop ring 33 mounted on the rear outer circumference of the pinion shaft 31.

In the end face of the rear end of pinion shaft 31, a recess 35 is formed, in which a first holder 36 which is a tube open at one end and closed at the other end is loosely fit. It is seen that a steel ball 37 for receiving a thrust force are disposed between a closed end of the first holder 36 and the inner wall of the recess 35.

The engine starter 10 of the present invention also comprises a solenoid switch assembly 40 (simply referred to as a switch assembly hereinafter) which causes the output rotary pinion shaft 31 to slide and Which has a switching function for closing the electrical contacts for supplying electrical power from the battery to the d.c. motor 15 by the closure of the key switch (not shown) of the vehicle. The switch assembly 40 is fastened to the outer end of the rear bracket portion 11a by bolts 41. The switch assembly 40 comprises an excitation coil 44 wound on a plastic bobbin supported by a front core 43a, a rear core 43b and a casing 42 which together define a magnetic circuit. The switch assembly 40 also comprises a plunger 45 slidably disposed within a central bore of the bobbin, and a movable assembly 46 mounted to the plunger 45. The plunger 45 is biased by a compression coil spring 47 disposed between it and the front core 43a to return to the original position shown in FIG. 2 when the key switch is put in the off position.

The movable assembly 46 comprises a rod 48 connected at one end (lefthand end in FIG. 2) to the plunger 45 so that the other end (righthand end) is positioned in opposition to face the rear end of the first holder 36 on the rear end of the pinion shaft 31. A third holder 49 having an opening 49a open toward the pinion shaft 31 is secured to the plunger side outer circumference of the rod 48 of the movable member 46. The third holder 49 has slidably mounted on it outer circumferential portion a movable contact assembly 50 having a movable contact 50c disposed between two insulators 50a and 50b. A second holder 51 is axially slidably mounted on the outer circumferential surface of the other end of the rod 48 of the movable assembly 46, and a spring 52 is disposed between the second holder 51 and the inner end of the opening 49a of the third holder 49 for biasing the pinion shaft 33 forward or toward the right in FIG. 2. Also, a spring 53 for biasing the pinion shaft 31 forward (righthand in FIG. 2) is disposed between the other end face of the rod 48 of the movable member 46 and the inner end wall of the first holder 36 inserted into the pinion shaft 31. A nonmagnetic plate 54 for closing the rear end of the casing 42 is provided for functioning as a stop during the rearward return of the plunger 45 and a rear wall of the solenoid switch assembly 40.

Figure 3:
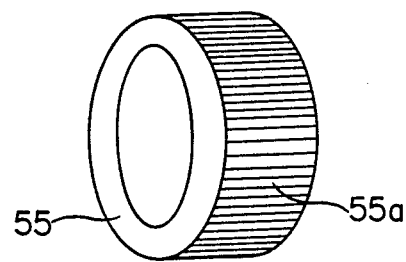
FIG. 3 is a perspective view of the sleeve member to be press fit onto the armatrue rotary shaft of the engine starter of the present invention.

In the engine starter 10 as described above, the armature rotary shaft 16 of the armature 13 of the d.c. motor 15 has formed at its one end (the left end as seen in FIG. 2) a small-diameter step portion 16b on the outer circumference over an axial length in which the cam surfaces 16a are not provided. Also, the radially outwardly extending flange-shaped stopper 16c is integrally formed on the outer circumference of the other end (the right end as seen in FIG. 2) of the armature rotary shaft 16. On the small-diameter portion 16b of the armature rotary shaft 16, a hollow cylindrical sleeve member 55 as shown in FIG. 3 is firmly secured by press fit. The outer circumference surface of the sleeve member 55 has a serration rolled portion 55a. The serration rolled portion 55a is formed by firmly pressing a rolling tool such as in the so-called knurl rolling to form a number of fine grooves or serrations. The outer diameter of the sleeve member 55 is made equal to the outer diameter of the portion of the armature rotary shaft 16 on which the cam surfaces 16a are formed, so that, when the sleeve member 55 is press fit over the small-diameter portion 16b of the armatrue rotary shaft 16, the outer diameter of the assembled shaft is the same over the entire length of the shaft except for the flange-like stopper 16c.

Figure 4:
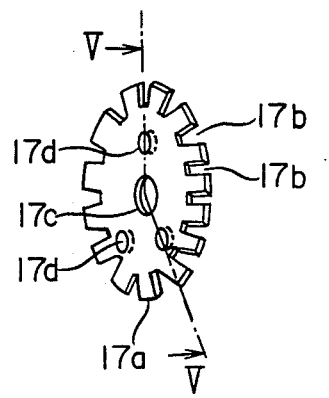
FIG. 4 is a perspective view of the disc constituting the laminated armature core of the engine starter of the present invention.
Figure 5:
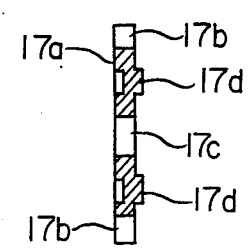
FIG. 5 is a cross-sectional view of the armature disc taken along line V—V of FIG. 4.

Over the armature rotary shaft 16 on which the sleeve member 55 is press fit as described above, the armature core 17 which is an assembly of a number of discs 17a laminated in the axial direction is placed. As shown in FIGS. 4 and 5, each of the discs 17a of the armature core 17 has a plurality of notches 17b at the outer periphery thereof through which the armature coil 19 is passed and a central opening 17c in which the armature rotary shaft 16 is inserted. Further, each of the discs 17a comprises on a predetermined position half-punched out engagement portions 17d which are formed by stamping to define a dimple on one surface and a projection on the opposite surface.

The discs 17a, when they are stacked in the axial direction, are assembled in the circumferentially aligned state with their projections of the positioning portions 17d engage with the dimples of the adjacent disc. When the assembled armature core 17 is placed over the armature rotary shaft 16 with the sleeve member 55 press fit on it, the flange-like stopper 16c on the other end of the shaft 16 prevents the armature core 17 from being dropped out from the shaft 16 in the righthand direction in FIG. 2, and the serration rolled portion 55a on the outer circumference of the sleeve member 55 on the one end of the shaft 16 secures by press fit in the circumferential the entire armatrue core 17 relative to the rotary shaft 16.

The armature rotary shaft is formed by carrying out surface treatment such as cementation hardening to provide strength required according to the application.

The operation of the engine starter 10 will now be described. When the unillustrated key switch is in the off position, no current through the solenoid coil 44 and the coil 44 is not excited, so that the plunger 45 is subjected only to the biasing force of the compression spring 47 disposed between the plunger 45 and the front core 43a. Therefore, the movable assembly 46 is positioned at the rear end and the plunger 45 abuts against the end plate 54. In this position, since the movable contact 23 and the stationary contact 50c are separated, the d.c. motor 15 stays still and the pinion shaft 31 is also held at the rear position shown in FIG. 2 by the spring 34.

When the key switch is turned on, the excitation coil 44 is energized to drive the plunger 45 forward, and the movable assembly 46 moves forward until the movable contact 50c is brought into electrical 5 contact with the stationary contact 23. Therefore, the armature coil 19 is energized through the brushes 18 and the commutator 14 to drive the d.c. motor 15. On the other hand, since the pinion shaft 31 is pressed forward by the springs 52 and 53 of the movable assembly 46, the pinion 31a on the pinion shaft 31 meshes with the engine ring gear (not shown) formed on the outer periphery of the engine fly wheel (not shown) simultaneously with the start up of the d.c. motor. Thus, the engine is driven by the d.c. motor to be started up.

After the engine has been started up, the pinion shaft 31 and the clutch inner member 26 on the pinion shaft 31 are rotated by the engine through the ring gear in the same direction but at a higher speed than that of the armature rotary shaft 16. Then, due to the over-running function or the one-way function of the over-running clutch mechanism 56, the armature rotary shaft 16 disengages from the inner member 26 so that the armature rotary shaft 16 is rotated in the idle state. When the key switch is turned off after the starting up has been completed, the movable assembly 40 is returned to the rear together with the plunger 45 due to the action of the spring 47 in the solenoid switch assembly 40, and the pinion shaft 31 returns rearward to the original position shown in FIG. 2 by the action of the spring 34.

Figure 6:
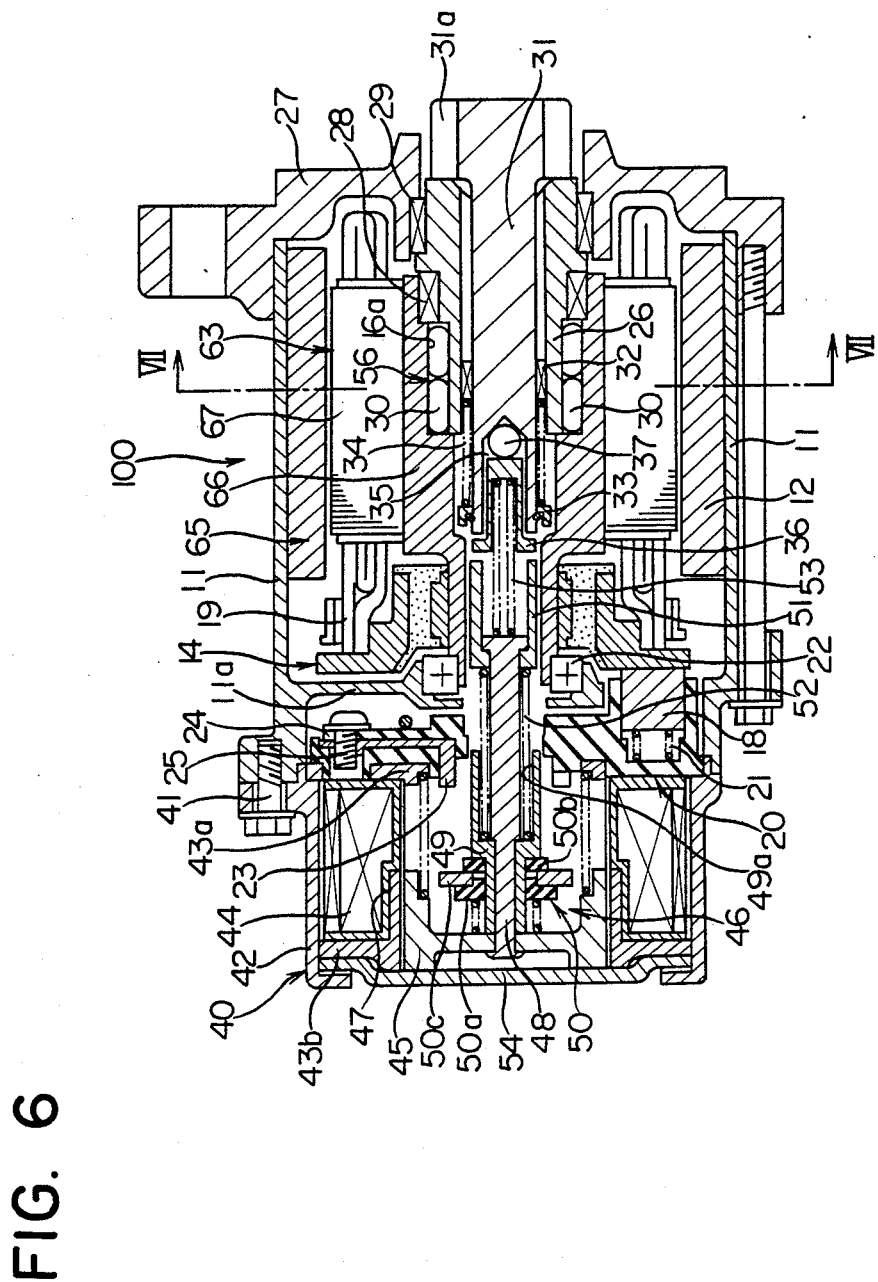
FIG. 6 is a longitudinal cross-sectional view of another embodiment of the engine starter of the present invention.
Figure 7:
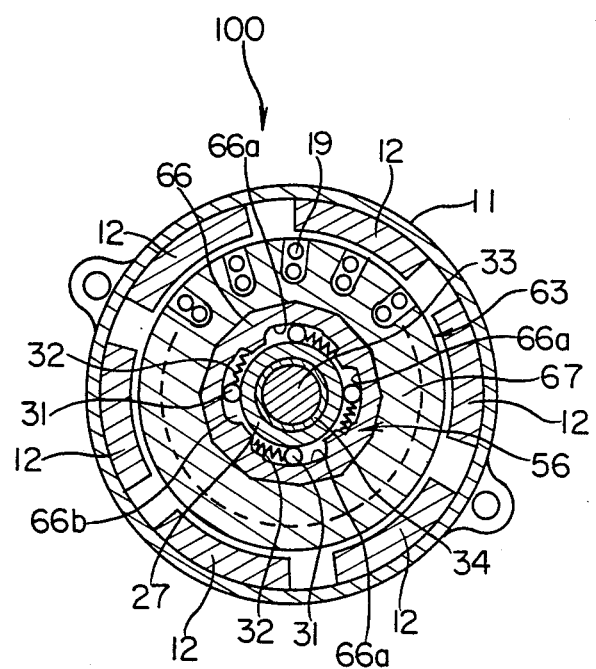
FIG. 7 is a cross-sectional view of the engine starter taken along line VII—VII of FIG. 6.

According to another embodiment of the present invention, the engine starter 100 a contruction illustrated in FIGS. 6 and 7, which only the structure of the armature rotary shaft 66 is different from that of the armature rotary shaft 16 as described above in conjunction with FIGS. 2 3. As best seen from FIG. 7, the armature rotary 66 of the armature 63 of the d.c. motor 15 twelve-sided, substantially polygonal cross section. Such a polygonal outer circumference of the armature rotary shaft 66 can be formed by cold forgoing at the time the cam surfaces 66a for the over-runing clutch 56 are formed in the inner circumferential surface of the armature rotary shaft 66. On the other hand, the armature core 67 is an assembly of a plurality of laminated disc-shaped plates and has a true-circular bore extending in the axial direction at its center. When the armature rotary shaft 66 is press-fit into this bore of the armature core 67 during assembly, a brazing material such as a phosphor copper brazing material is applied to the outer circumferential surface of the armature rotary shaft 66.

When the armature rotary 66 is press-fit into the armature core 67, the 66c of the polygonal outer circumference the rotary shaft 66 bite into the inner circumference of the armature core 67 since the armature core 67 made of a material softer than the armature rotary 66. Therefore, the cross-sectional shape of the circumference of the armature core 67 is deformed according to the polygonal outer circumference of the shaft 66 to become complementary to the outer circumferential configuration of the armature rotary shaft 66 shown in FIG. 7. Then, the armature 63, which is assembly of the armature rotary shaft 66 and the core 67 with the brazing material therebetween is heated to be brazed and annealed. The heating temperature can be from 780° C. to 850° C., and is preferably selected to be about 800° C. With the temperature thin this range, the brazing process and the magnet annealing process can be achieved concurrently because the brazing temperature should be about 700° C.–925° C. and the magnetic annealing temperature for eliminating the magnetoristriction generated upon the punching out of the plates constituting the armature core 67 should be about 780° C.–850° C.

While the outer circumferential configuration of the armature rotary shaft 66 is a twelve-sided polygon in the illustrated embodiment, a polygon with any number of sides may be employed. Also, although the above armature rotary shaft 66 has four cam surfaces 66a in the inner circumference, any number of cam surfaces may be used.

As has been described, to the engine starter of the present invention, means for securing the armature core on the armatrue rotary shaft in which cam surfaces of the overrunning clutch mechanism are formed in the inner circumference can be formed without deforming the cam surfaces, enabling the coaxial starter to have a shorter overall length, making the starter more lightweight and compact.

According to the engine starter of the present invention, the armature core is secured to the armature rotary shaft in which cam surfaces of the overrunning clutch mechanism are formed in the inner circumference by means of a polygonal cross-sectional configuration of the armature rottary shaft. Therefore, the outer circumferencial surface of the armature rotary shaft can be formed without deforming the cam surfaces in the inner circumference, making the manufacture of the engine starter practical.

Also, according to the method for manufacturing an engine starter of the present invention, the armature rotary shaft having a plygonal outer circumference is press fit into the armature core with a brazing material applied thereto and the assembly is heated and annealed at a temperature which is suitable both for brazing and annealing. Therefore, the brazing process and the magnetic annealing process can be achieved simultaneously and the mechanical connection between the two members can be made stronger and more reliable.

We claim:

1. An engine starter comprising
a d.c. motor including a hollow armature rotary shaft having a plurality of cam surfaces composing an over-running clutch mechanism formed on an inner pheripheral surface thereof and having a reduced-diameter portion formed at one end on an outer circumference thereof within an axial length range in which no cam surfaces are provided and having at the other end a radially outwardly extending stopper, a sleeve member having a rolled portion on the outer circumference thereof press fit onto said reduced-diameter portion of said armature rotary shaft, and an armature core placed over the outer circumference of said armature rotary shaft and press fit over the outer circumferential surface of said sleeve member;
a tubular inner member extending within the interior of said armature rotary shaft by at least an axial distance corresponding to the axial length of said cam surfaces;
a roller and a biasing spring disposed within each of wedge-shaped spaces defined between an outer circumferential surface of said inner member and said cam surfaces;
an output rotary shaft disposed within said inner member in a axially slidable engagement therewith by means of splines; and
a solenoid switch assembly capable of supplying electric power to said d.c. motor and simultaneously axially sliding said output rotary shaft.

2. An engine starter as claimed in claim 1, wherein said armature rotary shaft is formed by surface treatment such as cementation hardening.

3. An engine starter as claimed in claim 1, wherein said armature core comprises a number of circular plates laminated in the axial direction, each circular plate having a partly punched out engaging portion providing a recess on one surface of the circular plate and a projection on the other surface corresponding to said recess, said circular plates being assembled by putting said engagement portions in engagement with each other.

4. An engine starter as claimed in claim 2, wherein said armature core comprises a number of circular plates laminated in the axial direction, each circular plate having a partly punched out engaging portion providing a recess on one surface of the circular plate and a projection on the other surface corresponding to said recess, said circular plates being assembled by putting said engagement portions in engagement with each other.

5. An engine starter comprising
a d.c. motor including a hollow armature rotary shaft having formed on an inner peripheral surface a plurality of cam surfaces composing an overrunning clutch mechanism and having a polygonal cross-sectional outer configuration;
a tubular inner member inserted and supported within the interior of said armature rotary shaft by an axial distance corresponding to the axial length of said cam surfaces;
a roller and a biasing spring disposed within each of wedge-shaped spaces defined between an outer peripheral surface of said inner member and said cam surfaces;
an output rotary shaft disposed within said inner member in an axially slidable engagement therewith by means of splines; and
a solenoid switch assembly capable of supplying an electric power to said d.c. motor and simultaneously axially sliding the output rotary shaft.

6. A method for manufacturing an engine starter comprising a d.c. motor including a hollow armature rotary shaft having formed on an inner peripheral surface a plurality of cam surfaces composing an over-running clutch mechanism and having a polygonal cross-sectional outer configuration, a tubular inner member inserted and supported within the interior of said armature rotary shaft by an axial distance corresponding to the axial length of said cam surfaces, a roller and a biasing spring disposed within each of wedge-shaped spaces defined between an outer peripheral surface of said inner member and said cam surfaces, and an output rotary shaft disposed within said inner member in an axially slidable engagement therewith by means of splines, the method comprising the steps of inserting a brazing material between said armature core and said armature rotary shaft, and heating and annealing so that the step of brazing and the step of magnetic annealing for eliminating magnetic distortion of said armature core are achieved concurrently.

7. A method for manufacturing an engine starter as claimed in claim 6, wherein the annealing temperature in said heating and annealing step is between about 780° C. and about 850° C.

8. A method for manufacturing an engine starter as claimed in claim 6, wherein the annealing temperature in said heating and annealing step is about 800° C.

* * * * *